United States Patent [19]
Fischer et al.

[11] Patent Number: 5,657,573
[45] Date of Patent: Aug. 19, 1997

[54] ROTATABLE RACK FOR ORGANIZING FISHING TACKLE IN A TACKLE BOX

[76] Inventors: Ervin W. Fischer, 1119 University Dr. #401; Virgil Ervin Fischer, 422-S-13th St., both of Bismarck, N. Dak. 58504

[21] Appl. No.: 556,462

[22] Filed: Nov. 13, 1995

[51] Int. Cl.$^6$ ................................................ A01K 97/06
[52] U.S. Cl. ........................ 43/57.1; 43/54.1; 43/57.2
[58] Field of Search ........................... 43/54.1, 57.1, 43/57.2; 206/315.11

[56] References Cited

U.S. PATENT DOCUMENTS

| | | | |
|---|---|---|---|
| 2,138,190 | 11/1938 | Myers | 43/54.1 |
| 2,556,403 | 6/1951 | Sokolik | 43/25.2 |
| 2,603,549 | 7/1952 | Tessmer | 43/57.1 |
| 2,716,302 | 8/1955 | Dutton | 43/57.1 |
| 2,789,389 | 4/1957 | Moen | 43/57.2 |
| 4,513,526 | 4/1985 | Grace . | |
| 4,791,752 | 12/1988 | Van Kampen | 43/57.1 |
| 4,961,281 | 10/1990 | Listelbarger | 43/57.2 |
| 5,018,298 | 5/1991 | Spears | 43/57.2 |
| 5,025,588 | 6/1991 | Echols | 43/57.1 |
| 5,033,228 | 7/1991 | Gallivan | 43/54.1 |
| 5,123,197 | 6/1992 | Gentry . | |
| 5,289,940 | 3/1994 | Wisenbaugh | 43/57.1 |
| 5,319,877 | 6/1994 | Hagan . | |
| 5,544,442 | 8/1996 | Perkins | 43/57.1 |

*Primary Examiner*—Kurt Rowan
*Attorney, Agent, or Firm*—David A. Lingbeck

[57] ABSTRACT

A rotatable rack for organizing fishing tackle in a tackle box comprises an elongate cylindrical member having openings in the ends, a piece of foam material wrapped and fastened about the cylindrical member, a pair of bushings removeably received in the openings in the ends of the cylindrical member, a pair of rivets upon which the bushings are rotatably mounted, and a pair of planar mounts to which the rivets are mounted. The planar mounts are adapted to slide in slots formed by ribs in the walls separating the fishing tackle box into compartments. The cylindrical member is rotatable with the bushings and is suspended above a surface of the fishing tackle box by the rivets such as the bottom wall of the tackle box or even the bottom wall of a tray. Fishing tackle such as spinners and snells are wrapped about and fastened to the foam and the cylindrical member for easy and safe access and for storage without the fishing tackle becoming tangled.

5 Claims, 3 Drawing Sheets

FIG. 2

ROTATABLE RACK FOR ORGANIZING FISHING TACKLE IN A TACKLE BOX

BACKGROUND OF THE INVENTION

The present invention relates to a rotatable rack for organizing fishing tackle in a tackle box. The rack is rotatably mounted in a tackle box with fishing lures as such spaced from each other and wrapped essentially about the rack to allow the user to easily and without fear of being hurt by getting hooked with a fishing hook, retrieve a fishing lure from the tackle box.

Conventional tackle boxes tend to be compartmentalized and compact such that fishing hooks, lures, and tackle in general are typically thrown in the compartments without regards to any particular organization or to any effects or harm the hooks can cause to the user of the tackle box. Some attempts have been made by the prior art to organize the fishing hooks, lures, and tackle except that the changes offered by the prior art has been without regards to the tackle boxes already in use.

One known prior/art is a MULTIFUNCTIONAL FISHING TACKLE BOX, U.S. PAT. NO. 5,319,877, issued on Jun. 14, 1994 and invented by John F. Hagan, which comprises an insulated cylindrical main container having a ventilated well, and a plurality of cylindrical tackle trays nestable within the main container and being sealed against leakage.

Another known prior art is a FISHING TACKLE ORGANIZER, U.S. PAT. NO. 4,513,526, issued on Apr. 30, 1985 and invented by Virgil Grace, which comprises a first bracket for mounting to a boat a second bracket for also mounting to the boat, a shaft rotatably supported by the brackets, a first plate mounted on the shaft and a plurality of circumferential spaced apertures, a second plate mounted on the shaft and spaced from the first plate, and compartment disposed between the two plates.

Another known prior art is a FISHING PLUG AND LURE ORGANIZER, U.S. PAT. NO. 4,516,707, issued on May 14, 1985, which comprises a housing unit, a cover for the housing unit and being telescopingly slidable over the housing unit, a transparent means in the cover, and a removable holder carried by the housing unit to store the fishing lures and plugs in an orderly array.

Another known prior art is a FISHING BAIT ORGANIZER, U.S. PAT. NO. 5,123,197, issued on Jun. 23, 1992 and invented by William T. Gentry, which comprises a support means for supporting a plurality of storage bags which are arranged in discrete groups.

None of the prior art describes or suggests mounting a rotatable rack directly in a conventional tackle box with the fishing lures, hooks, and tackle being orderly wrapped about the rack for easy and safe retrieval of any of the accessories.

SUMMARY OF THE INVENTION

This invention relates to a rotatable rack for storing fishing tackle in a fishing tackle box which comprises a cylindrical member having open ends, a piece of foam dimensioned to enclose and fixedly wrap about the cylindrical member except for the ends of the cylindrical member, a pair of bushings adapted to be received in the ends of the cylindrical member and upon which the cylindrical member is rotatably mounted, a pair of rivets for supporting the bushings, and a pair of planar mounts to which the rivets are fixedly attached, the planar mounts being adapted to mount inside the fishing tackle box with the fishing lures and hooks being spacedly wrapped about the rack for orderly storage in the tackle box.

One objective of the present invention is to provide a rotatable rack for organizing fishing tackle in a tackle box which allows the user to continue using his/her conventional tackle box rather getting a separate fishing tackle organizer as suggested by the prior art.

Another objective of the present invention is to provide a rotatable rack for organizing fishing tackle in a tackle box which orderly arranges the fishing tackle in a tackle box such that the user can retrieve any of his/her fishing tackle easily and safely without worry of being hooked with a fishing hook.

Also, another objective of the present invention is to provide a rotatable rack for organizing fishing tackle in a fishing tackle box which is adaptable to be used in most any fishing tackle boxes no matter how large or how small the fishing tackle box may be.

Further objectives and advantages of the present invention will become apparent as the description proceeds and when taken in conjunction with the accompanying drawings wherein:

DETAILED DESCRIPTION OF THE INVENTION

Figure 1:
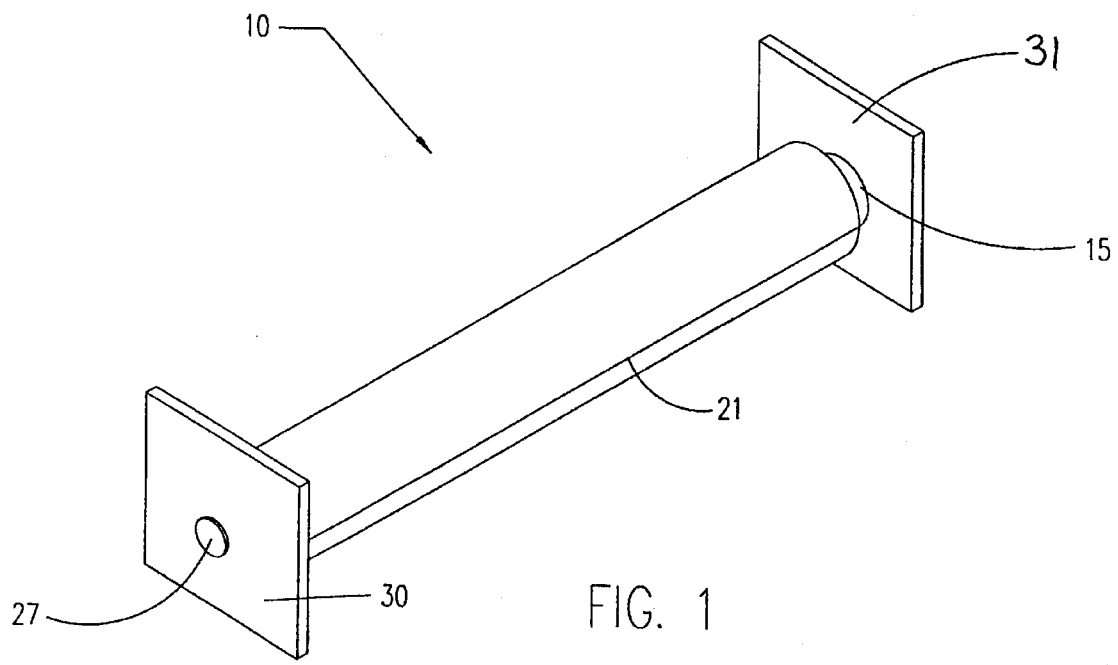
FIG. 1 is a perspective view of the rotatable rack.

Referring to the drawings in FIGS. 1–4, in particular, the rotatable rack 10 for organizing fishing tackle in a fishing tackle box 35 comprises an elongate cylindrical member 15 preferably made of plastic or PVC material and having open ends 16, and further comprises a piece of foam material 20 preferably having a thickness of at least one-quarter inch and having a length substantially equal to the length of the cylindrical member 15 and having a sufficient width such that the foam material 20 can be wrapped about the cylindrical member 15 with the longitudinal edges of the foam material 20 becoming adjoined about the circumference of the cylindrical member 15. The piece of foam material 20 is securely fastened to the cylindrical member 15. The fishing lures and hooks 37 such as spinners or snells are wrapped around the cylindrical member 15 upon the foam material 20 with the hooks being inserted in the longitudinal slot 21 formed by the adjoined longitudinal edges of the foam material 20. The other ends of the fishing lures and hooks 37 are fastened to the foam material with tacks (not shown) as such. The fishing lures and hooks 37 on the rack 10 are spaced from one another along the length of the cylindrical member 15 and are essentially arranged in distinctively separate rows so that the fishing lures and hooks 37 do not become entangled with one another as the case would be if all the fishing lures and hooks 37 were simply put together in a compartment 36 inside the fishing tackle box 35.

Figure 4:
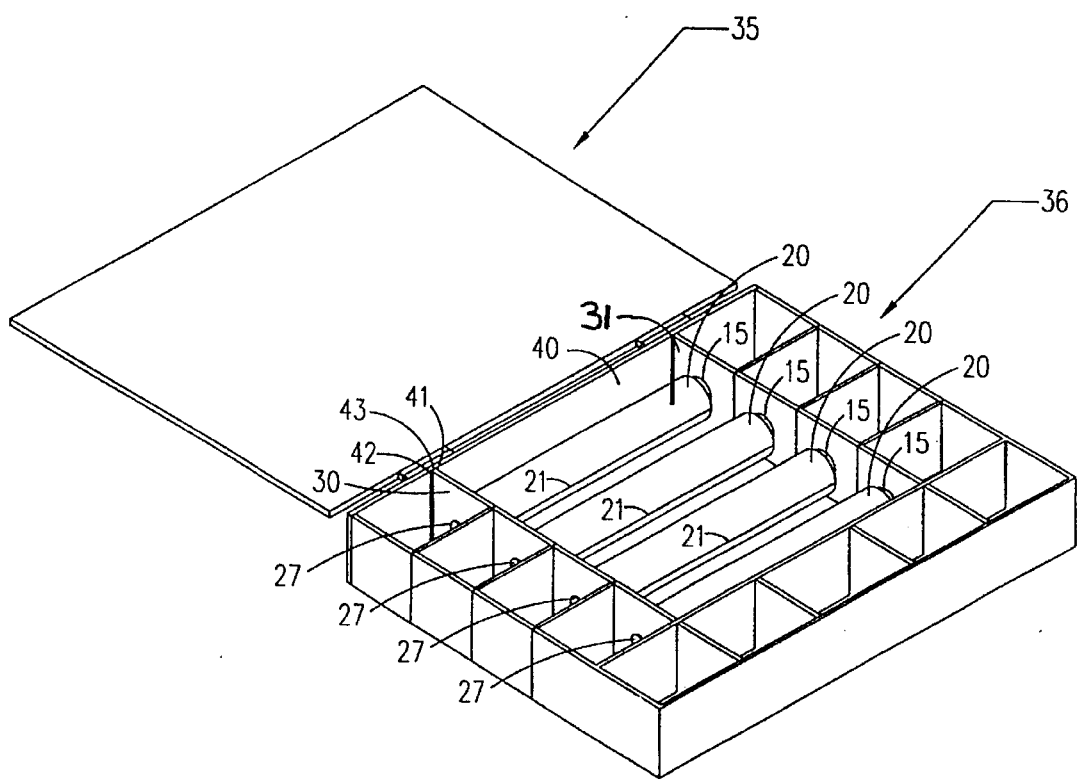
FIG. 4 is an exploded view of the rotatable rack.
Figure 2:
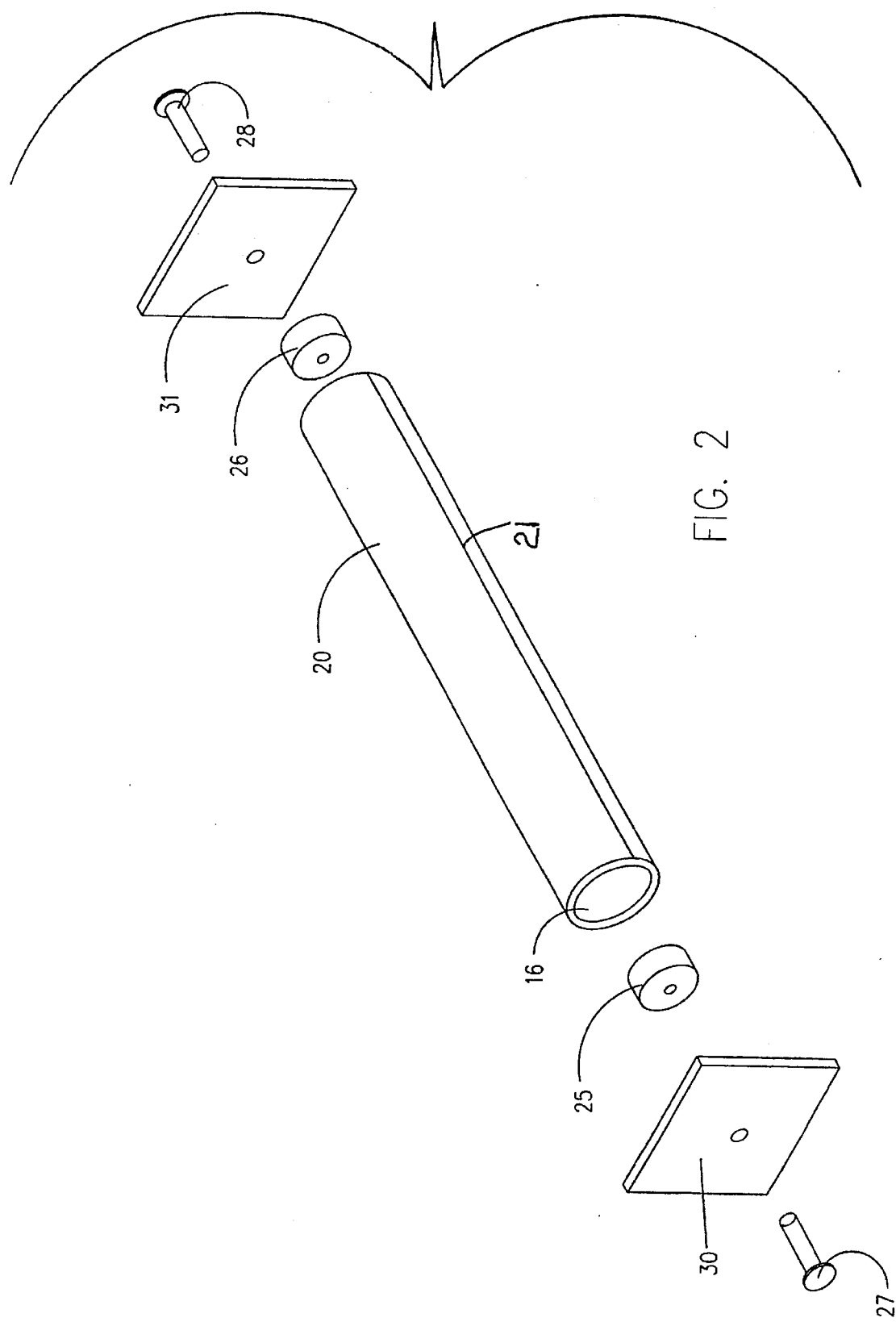
FIG. 2 is a perspective view of the rotatable rack mounted in a fishing tackle box.
Figure 3:
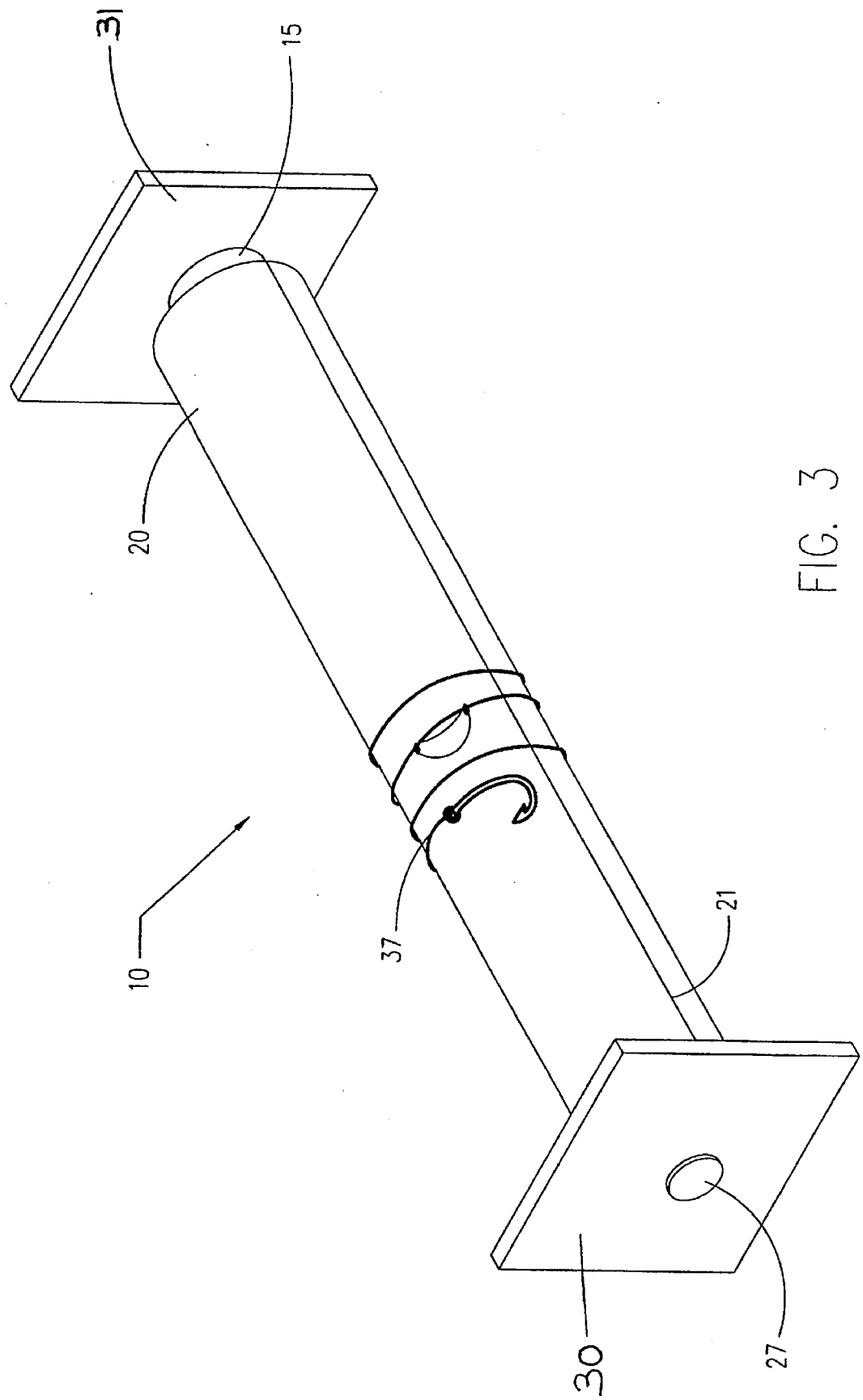
FIG. 3 is perspective view of the cylindrical member and foam wrap with fishing tackle orderly mounted about the cylindrical member of the rotatable rack.

As shown in FIGS. 1 & 4, the cylindrical member 15 is mounted upon a pair of bushings 25 & 26 which are adapted to be removeably and engageably received in the openings 16 at the ends of the cylindrical member 15, one to each end of the cylindrical member 15. The bushings 25 & 26 which are preferably made of plastic are rotatably mounted upon a pair of rivets 27 & 28 which extend through and are mounted to a pair of planar mounts 30 & 31 which are adapted to securely mount inside a fishing tackle box 35. Most conventional fishing tackle boxes have Walls with pairs of ribs 41 & 42 vertically disposed upon and spaced along the walls 40. The ribs 41 & 42 in each pair of ribs are spaced apart from one another and for a slot 43 therebetween. Conventional fishing tackle boxes have more than one wall 40 separating the space inside the fishing tackle boxes. The planar mounts 30 & 31 removeably and slidably mount in the slots 43 on the walls 40 with the side edges of the planar mounts 30 & 31 extending in the slots and 43 the bottom edges of the mounts 30 & 31 resting upon a surface such as the bottom of the fishing tackle box 35 or even a tray in the fishing tackle box. Whatever type of surface the planar mounts 30 & 31 end up resting upon, the elongate cylindrical member 15 is suspended above the surface of the fishing tackle box 35 by the rivets 27 & 28 so that the cylindrical member 15 can freely rotate about its longitudinal axis. Fishing tackle such as spinners and snells can be easily and safely retrieved from the fishing tackle box and from the rotatable rack by simply removing the fastener or tack from the foam material 20 and grasping the end of the spinner or snell and urging the spinner or snell outward from the rack and from the fishing tackle box which results in the cylindrical member rotating on its axis and the spinner or snell being retrieved from the fishing tackle box easily and safely. When the user is finished with the spinner or snell, he/she can simply place the hook in the longitudinal slot formed by the adjoined longitudinal edges of the foam material and rotate the cylindrical member which takes up the spinner or snell, and once the spinner or snell is wrapped about the foam and cylindrical member, the user can fasten the end opposite the hook end to the foam material with the fastener or tack. The cylindrical member is adapted to rotate inside the fishing tackle box, and allows the user to keep the fishing tackle tangle free as he/she either retrieves the fishing tackle from the fishing tackle box or replaces and stores the fishing tackle inside the fishing tackle box.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A rotatable rack for organizing fishing tackle in a tackle box comprising:

an elongate cylindrical member having openings in the ends thereof;

a piece of foam material fastenably wrapped about said cylindrical member and to which said fishing tackle is removeably attachable; and a means for supporting and mounting said cylindrical member inside said tackle box, said means for supporting and mounting said cylindrical member inside said tackle box further comprises a pair of bushings removeably received in said openings of said cylindrical member; a pair of rivets upon which said bushings are rotatably mounted; and a pair of planar mounts having sides and side edges and bottom edges and through which said rivets are mounted.

2. A rotatable rack for organizing fishing tackle in a tackle box as described in claim 1, wherein said rivets are dimensioned to extend in holes of said bushings.

3. A rotatable rack for organizing fishing tackle in a tackle box as described in claim 1, wherein said planar mounts are adapted to removeably mount upon a surface inside said tackle box such that said cylindrical member is rotatably suspended above said surface.

4. A rotatable rack for organizing fishing tackle in a tackle box as described in claim 3, wherein said planar mounts are vertically mounted inside said tackle box and are removeably fixed by walls inside said tackle box.

5. A rotatable rack for organizing fishing tackle in a tackle box as described in claim 4, wherein said side edges of said planar mounts are removeably and slidably mounted in slots of said walls inside said tackle box.

* * * * *